(12) United States Patent
Zhang

(10) Patent No.: US 8,678,603 B2
(45) Date of Patent: Mar. 25, 2014

(54) BACKLIGHT MODULE HAVING ELASTIC HOLDER AND LIQUID CRYSTAL DISPLAY EMPLOYING SAME

(75) Inventor: Tian Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 211 days.

(21) Appl. No.: 13/375,328

(22) PCT Filed: May 5, 2011

(86) PCT No.: PCT/CN2011/073713
§ 371 (c)(1),
(2), (4) Date: Nov. 30, 2011

(87) PCT Pub. No.: WO2012/129829
PCT Pub. Date: Oct. 4, 2012

(65) Prior Publication Data
US 2012/0250294 A1 Oct. 4, 2012

(30) Foreign Application Priority Data
Mar. 29, 2011 (CN) .......................... 2011 1 0077341

(51) Int. Cl.
*G09F 13/04* (2006.01)
(52) U.S. Cl.
USPC .......... 362/97.1; 362/457; 362/632; 362/634; 349/60

(58) Field of Classification Search
USPC ................ 362/632–634, 611–613, 457, 97.1; 349/60
See application file for complete search history.

(56) References Cited

U.S. PATENT DOCUMENTS

| 7,578,610 | B2 * | 8/2009 | Sakamoto et al. | 362/634 |
| 7,677,750 | B2 * | 3/2010 | Jeon et al. | 362/97.3 |
| 7,843,528 | B2 * | 11/2010 | Byoun et al. | 349/69 |
| 7,959,324 | B2 * | 6/2011 | Hsu | 362/247 |
| 8,337,069 | B2 * | 12/2012 | Cho et al. | 362/633 |

FOREIGN PATENT DOCUMENTS

| CN | 1731250 A | 2/2006 |
| CN | 101017278 A | 8/2007 |
| CN | 101608651 A | 12/2009 |
| CN | 101688988 A | 3/2010 |
| CN | 101876765 A | 11/2010 |
| CN | 101943375 A | 1/2011 |
| JP | 2008-165101 A | 7/2008 |

\* cited by examiner

*Primary Examiner* — Robert May
(74) *Attorney, Agent, or Firm* — Cheng-Ju Chiang

(57) ABSTRACT

The present disclosure provides a backlight module. The backlight module includes a light source, a thermal plate, a back cover and an elastic holder. The light source is arranged on the thermal plate. The thermal plate is arranged on the back cover, and includes a first hole defined therein. The back cover includes a second hole defined therein, and the second hole overlaps with the first hole. The elastic holder penetrates through the first hole and the second hole, holds two surfaces of the thermal plate and the back cover apart from each other for fixing the thermal plate on the back cover. The present disclosure further provides a liquid crystal display.

18 Claims, 4 Drawing Sheets

BACKLIGHT MODULE HAVING ELASTIC HOLDER AND LIQUID CRYSTAL DISPLAY EMPLOYING SAME

TECHNICAL FIELD

The present disclosure generally relates to liquid crystal displays (LCDs), and more particularly to a backlight module and to a liquid crystal display employing the backlight module.

BACKGROUND

At present, liquid crystal displays are widely used in various electronic devices, such as computer monitors, TVs, notebooks, mobile phones and digital cameras, due to their advantages, such as slim shape, energy saving and low radiation. Liquid crystal material in the liquid crystal displays does not emit any light beams itself. Therefore, a backlight module is required in the liquid crystal displays to provide light beams for the liquid crystal material.

In a conventional backlight module, a light source produces a large mount of heat while it provides the light. Thus, the light source is usually arranged on a thermal plate to dissipate the heat. The thermal plate is usually fixed on a back cover of the backlight module with screws, which will take a lot of assembly time and reduce production efficiency of the liquid crystal displays. Moreover, the screw has a small fixing area, and this makes a non-uniform pressure distribution on the thermal plate. Thermal dissipating passages having various thermal resistances are formed between the thermal plate and the back cover. Consequently, a temperature of the backlight is non-uniform, which has a negative effect to the quality of the liquid crystal displays.

What is needed, therefore, is a backlight module which may overcome the above-described problems. What is also needed is a liquid crystal display employing such a backlight module.

SUMMARY

Accordingly, the present disclosure provides a backlight module and a liquid crystal display employing the backlight module which may reduce assembly time of the backlight module.

The present disclosure provides a backlight module including a light source, a thermal plate, a back cover and an elastic holder. The thermal plate includes a first piece and a second piece perpendicular to the first piece. The first piece includes a first hole defined therein. The light source is arranged on the second piece. The back cover includes a second hole defined therein. The first piece is arranged on the back cover. The second hole is arranged to overlap with the first hole. The elastic holder is made by a bended wire and includes a first holding apparatus, two first connection apparatuses, two second holding apparatuses and two second connection apparatuses. The first holding apparatus is supported on an upper side surface of the first piece. The two first connection apparatuses are connected to an end portion of the first holding apparatus, respectively. The two first connection apparatuses extend in a direction perpendicular to the upper side surface of the first piece and penetrate through the first hole and the second hole. The two second holding apparatuses are arranged on two sides of the two first connection apparatuses, and abut a lower side surface of the back cover. The two second connection apparatuses are connected to one of the first connection apparatuses and one of the second holding apparatuses, respectively. The second connection apparatuses bend toward the first holding apparatus in order that a distance between the first holding apparatus and the second holding apparatuses measured in the direction perpendicular to the upper side surface of the first piece is less than an extending distance of the two first connection apparatuses.

The present disclosure provides a backlight module including a light source, a thermal plate, a back cover and an elastic holder. The thermal plate includes a first hole defined therein. The light source is arranged on the thermal plate. The back cover includes a second hole defined therein. The thermal plate is arranged on the back cover. The second hole is arranged to overlap with the first hole. The elastic holder penetrates through the first hole and the second hole, and holds two side surfaces of the thermal plate and the back cover apart from each other for fixing the thermal plate on the back cover.

Preferably, the elastic holder is made by a bended wire and includes a first holding apparatus, two first connection apparatuses, two second holding apparatuses and two second connection apparatuses. The first holding apparatus is supported on an upper side surface of the thermal plate. The two first connection apparatuses are connected to an end portion of the first holding apparatus, respectively. The two first connection apparatuses extend in a direction perpendicular to the upper side surface of the thermal plate and penetrate through the first hole and the second hole. The two second holding apparatuses are arranged on two sides of the two first connection apparatuses, and abut a lower side surface of the back cover. The two second connection apparatuses are connected to one of the first connection apparatuses and one of the second holding apparatuses, respectively. The second connection apparatuses bend toward the first holding apparatus in order that a distance between the first holding apparatus and the second holding apparatuses measured in the direction perpendicular to the upper side surface of the thermal plate is less than an extending distance of the two first connection apparatuses.

Preferably, the first holding apparatus has an arced structure, and the second holding apparatuses have a ⊓-shaped structure, respectively.

Preferably, the first holding apparatus and the second holding apparatuses are arranged on a same side of a surface defined by the two first connection apparatuses.

Preferably, the thermal plate further includes a first sliding slot connecting the first hole and an edge of the thermal plat. The back cover includes a third hole and a second sliding slot connecting to the second hole and the third hole. The third hole is capable of allowing the first holding apparatus to pass therethrough. The first sliding slot overlaps with the second sliding slot for allowing the first connection apparatuses to slide into the first hole and the second hole via the first sliding slot and the second sliding slot after the first holding apparatus passes through the third hole.

Preferably, a distance between outer side edges of the two first connection apparatuses is greater than widths of the first sliding slot and the second sliding slot. The thermal plate includes an inverted V-shaped opening defined at the edge thereof. The first sliding slot interconnects the first hole and the inverted V-shaped opening. The inverted V-shaped opening is capable of guiding the first connection apparatuses into the first sliding slot and the second sliding slot.

Preferably, the upper side surface of the thermal plate includes a first upper side surface, a second upper side surface protruding from the first upper side surface, and a connection surface connecting the first upper side surface and the second upper side surface. The first holding apparatus is supported on the second upper side surface.

Preferably, the connection surface is an inclined surface.

Preferably, the backlight module further includes a plurality of other elastic holders same with the elastic holder, and integrally made by the bended wire.

Preferably, the thermal plate includes a first piece and a second piece perpendicular to the first piece. The first piece is arranged on the back cover. The first hole is defined in the first piece. The light source is arranged on the second piece.

The present disclosure provides a liquid crystal display including a backlight module. The backlight module includes a light source, a thermal plate, a back cover and an elastic holder. The thermal plate includes a first hole defined therein. The light source is arranged on the thermal plate. The back cover includes a second hole defined therein. The thermal plate is arranged on the back cover. The second hole is arranged to overlap with the first hole. The elastic holder penetrates through the first hole and the second hole, and holds two side surfaces of the thermal plate and the back cover apart from each other for fixing the thermal plate on the back cover.

Preferably, the elastic holder is made by a bended wire and includes a first holding apparatus, two first connection apparatuses, two second holding apparatuses and two second connection apparatuses. The first holding apparatus is supported on an upper side surface of the thermal plate. The two first connection apparatuses are connected to an end portion of the first holding apparatus, respectively. The two first connection apparatuses extend in a direction perpendicular to the upper side surface of the thermal plate and penetrate through the first hole and the second hole. The two second holding apparatuses are arranged on two sides of the two first connection apparatuses, and abut a lower side surface of the back cover. The two second connection apparatuses are connected to one of the first connection apparatuses and one of the second holding apparatuses, respectively. The second connection apparatuses bend toward the first holding apparatus in order that a distance between the first holding apparatus and the second holding apparatuses measured in the direction perpendicular to the upper side surface of the thermal plate is less than an extending distance of the two first connection apparatuses.

Preferably, the first holding apparatus has an arced structure, and the second holding apparatuses have a ⊓-shaped structure, respectively.

Preferably, the first holding apparatus and the second holding apparatuses are arranged on a same side of a surface defined by the two first connection apparatuses.

Preferably, the thermal plate further includes a first sliding slot connecting the first hole and an edge of the thermal plat. The back cover includes a third hole and a second sliding slot connecting to the second hole and the third hole. The third hole is capable of allowing the first holding apparatus to pass therethrough. The first sliding slot overlaps with the second sliding slot for allowing the first connection apparatuses to slide into the first hole and the second hole via the first sliding slot and the second sliding slot after the first holding apparatus passes through the third hole.

Preferably, a distance between outer side edges of the two first connection apparatuses is greater than widths of the first sliding slot and the second sliding slot. The thermal plate includes an inverted V-shaped opening defined at the edge thereof. The first sliding slot interconnects the first hole and the inverted V-shaped opening. The inverted V-shaped opening is capable of guiding the first connection apparatuses into the first sliding slot and the second sliding slot.

Preferably, the upper side surface of the thermal plate includes a first upper side surface, a second upper side surface protruding from the first upper side surface, and a connection surface connecting the first upper side surface and the second upper side surface. The first holding apparatus is supported on the second upper side surface.

Preferably, the connection surface is an inclined surface.

Preferably, the backlight module further includes a plurality of other elastic holders same with the elastic holder, and integrally made by the bended wire.

In the backlight module of the present disclosure, the elastic holder penetrating through the first hole of the thermal plate and the second hole of the back cover is used to hold the two side surfaces of the thermal plate and the back cover apart from each other. Thus, the thermal plate may be fixed on a desired position of the back cover with relatively short assembly time.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF PREFERRED EMBODIMENTS

Figure 1:
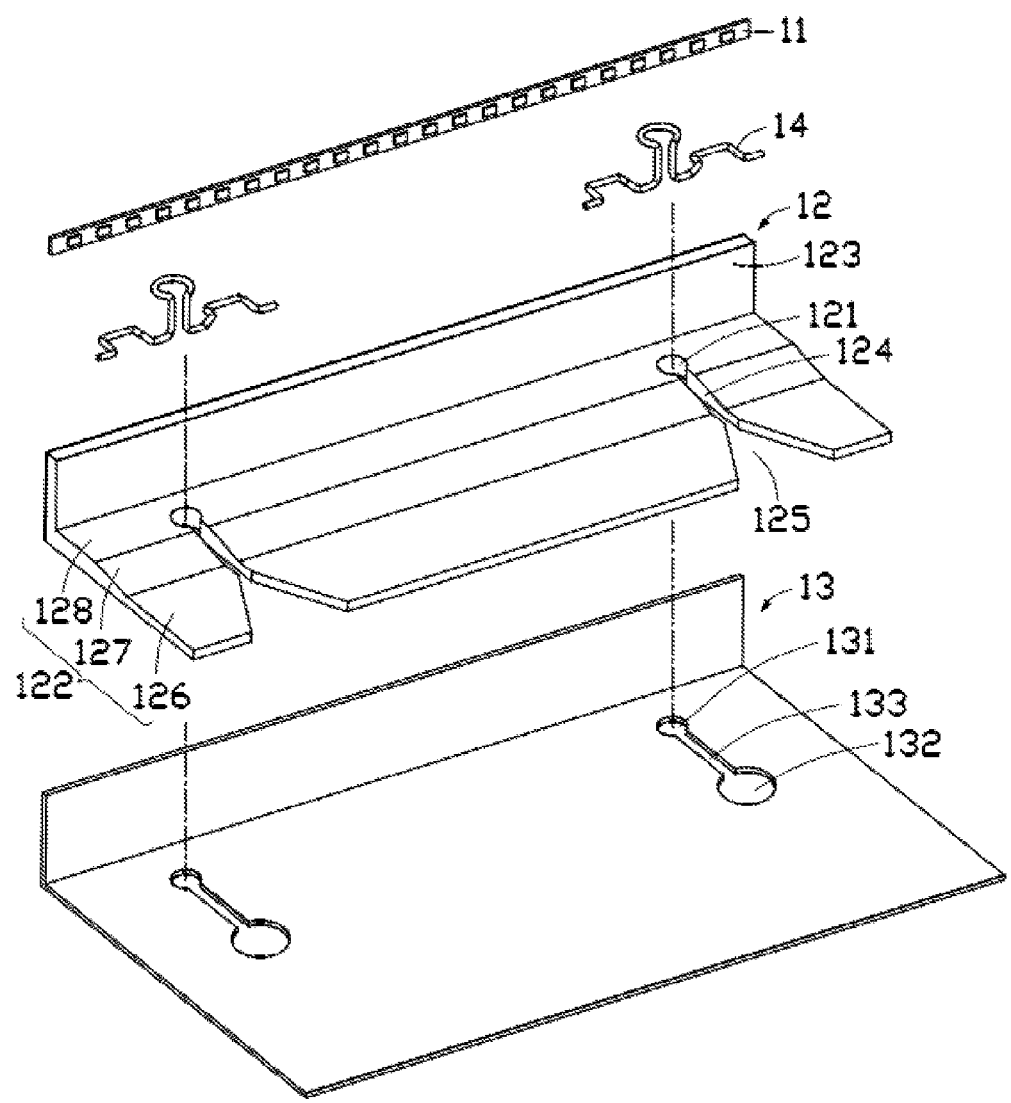
FIG. 1 is an isometric view of a backlight module according to a first embodiment of the present disclosure in an unassembled state.
Figure 2:
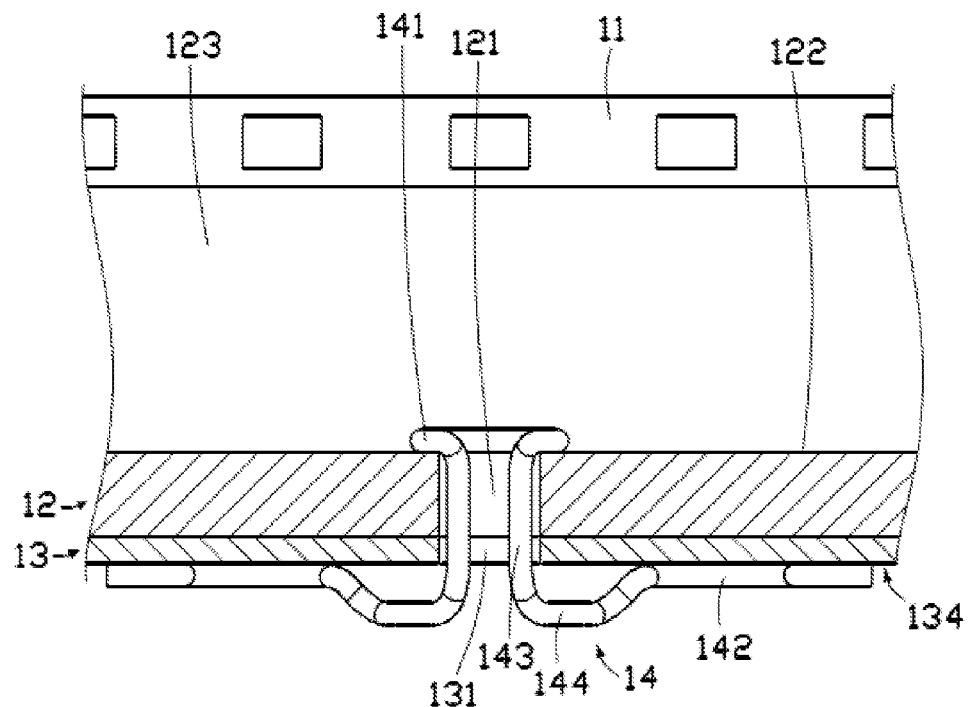
FIG. 2 is a cross-sectional view of a portion of the backlight module according to the first embodiment of the present disclosure in an assembled state.

Referring to FIG. 1 and FIG. 2, FIG. 1 is an isometric view of a backlight module according to a first embodiment of the present disclosure in an unassembled state, and FIG. 2 is a cross-sectional view of a portion of the backlight module according to the first embodiment of the present disclosure in an assembled state. As shown in FIG. 1 and FIG. 2, the backlight module of the first embodiment includes a light source 11, a thermal plate 12, a back cover 13 and an elastic holder 14. The thermal plate 12 includes a first hole 121 defined therein, and the back cover 13 includes a second hole 131 defined therein.

In assembled state, the light source 11 is located at the thermal plate 12 which is further arranged on the back cover 13, and the second hole 131 overlaps on the first hole 121. The elastic holder 14 penetrates through the first hole 121 and the second hole 131, and holds two side surfaces of the thermal plate 12 and the back cover 13 apart from each other, thereby fixing the thermal plate 12 on the back cover 13. In the illustrated embodiment, the light source 11 is an LED bar including a plurality of LEDs. The thermal plate 12 is an L-shaped aluminum plate formed by a press-forming method, and includes a first piece 122 and a second piece 123 perpendicular to the first piece 122. The first piece 122 is arranged on the back cover 13. The first hole 121 is defined in the first piece 122. The light source 11 is arranged on the second piece 123. However, an ordinary skilled person in art may design other shaped thermal plates or employ other kinds of light sources, which is not specifically limited in the present disclosure.

As illustrated in FIG. 2, the elastic holder 14 includes a first holding apparatus 141, two second holding apparatuses 142, two first connection apparatuses 143 and two second connection apparatuses 144. The first holding apparatus 141 is supported on an upper side surface of the thermal plate 12, and is particularly supported on an upper side surface of the first piece 122 of the thermal plate 12. The two first connection apparatuses 143 are connected to an end portion of the first holding apparatus 141, respectively, and extend in a direction perpendicular to the upper side surface of the first piece 122 of the thermal plate 12 and penetrate through the first hole 121 and the second hole 131. The second holding apparatuses 142 are arranged on two sides of the two first connection apparatuses 143, respectively, and further abut a lower side surface 134 of the back cover 13. The two second connection apparatuses 144 are connected to one of the first connection apparatuses 143 and one of the second holding apparatuses 142, respectively. The two connection apparatuses 144 bend toward the first holding apparatus 141 in order that a distance between the first holding apparatus 141 and the second holding apparatus 142 measured in the direction perpendicular to the upper side surface of the thermal plate 12 is less than an extending distance of the two first connection apparatuses 143. In the illustrated embodiment, the elastic holder 14 may be made by a bended wire, which may make the elastic holder 14 be easily and conveniently manufactured with a low cost.

Moreover, under a natural state, the distance between the first holding apparatus 141 and the second holding apparatuses 142 measured in the direction perpendicular to the upper side surface of the thermal plate 12 is less than a total thickness of the thermal plate 12 and the back cover 13 where the first hole 121 and the second hole 131 are defined. Therefore, when the first holding apparatus 141 and the second holding apparatuses 142 are supported on the upper side surface of the thermal plate 12 and the lower side surface of the back cover 13, respectively, the first connection apparatuses 143 and the second connection apparatuses 144 provide an effective elastic force for the first holding apparatus 141 and the second holding apparatuses 142, and the first holding apparatus 141 and the second holding apparatuses 142 may firmly hold the thermal plate 12 and the back cover 13.

In the illustrated embodiment, the first holding apparatus 141 has an arced structure, and the second holding apparatus 142 has a ⊓-shaped structure. The first holding apparatus 141 and the second holding apparatuses 142 are preferably arranged on a same side of a surface defined by the two first connection apparatuses 143. With the above-described configuration, the elastic holder 14 may provide an effective holding force and has a large pressing area. However, as known by the ordinary person skilled in art, the above-described configuration is just one embodiment of the present disclosure, and the first holding apparatus 141 and the second holding apparatuses 142 may be designed as other shapes, and the first holding apparatus 141 and the second holding apparatuses 142 may be arranged on two different sides of the surface defined by the two first connection apparatuses 143. Furthermore, as known by the ordinary person skilled in art, other kinds of elastic holders capable of penetrating through the first hole 121 and the second hole 131 may be designed to replace the elastic holder 14, which is not specifically limited in the present disclosure.

Referring back to FIG. 1, for the convenience of assembling the elastic holder 14, the thermal plate 12 further includes a first sliding slot 124 connecting the first hole 121 and an edge of the thermal plate 12. In particular, the first sliding slot 124 connects the first hole 121 and an edge of the first piece 122. The back cover 13 includes a third hole 132 and a second sliding slot 133 connecting to the second hole 131 and the third hole 132. The third hole 132 is capable of allowing the first holding apparatus 141 to pass therethrough. The first sliding slot 124 overlaps with the second sliding slot 133 for allowing the first connection apparatuses 143 to slide into the first hole 121 and the second hole 131 via the first sliding slot 124 and the second sliding slot 133 after the first holding apparatus 141 passes through the third hole 132.

Furthermore, under a natural state, a distance between outer side edges of the two first connection apparatuses 143 is greater than widths of the first sliding slot 124 and the second sliding slot 133 for preventing the two first connection apparatuses 143 to slide into the first sliding slot 124 and the second sliding slot 133 again under external forces after the first connection apparatuses 143 slide into the first hole 121 and the second hole 131. Therefore, for the convenience of the first connection apparatuses 143 sliding into the first sliding slot 124 and the second sliding slot 133, the thermal plate 12 includes an inverted V-shaped opening 125 defined in the edge thereof. The first sliding slot 124 interconnects the first hole 121 and the inverted V-shaped opening 125, and the inverted V-shaped opening 125 is capable of guiding the first connection apparatuses 143 into the first sliding slot 124 and the second sliding slot 133.

It should be noted that the inverted V-shaped opening 125, the first sliding slot 124, the third hole 132 and the second sliding slot 133 are defined for conveniently assembling the elastic holder 14. When the elastic holder 14 may be arranged in the first hole 121 and the second hole 131 in other ways, the above-described arrangements may be omitted.

Figure 3:
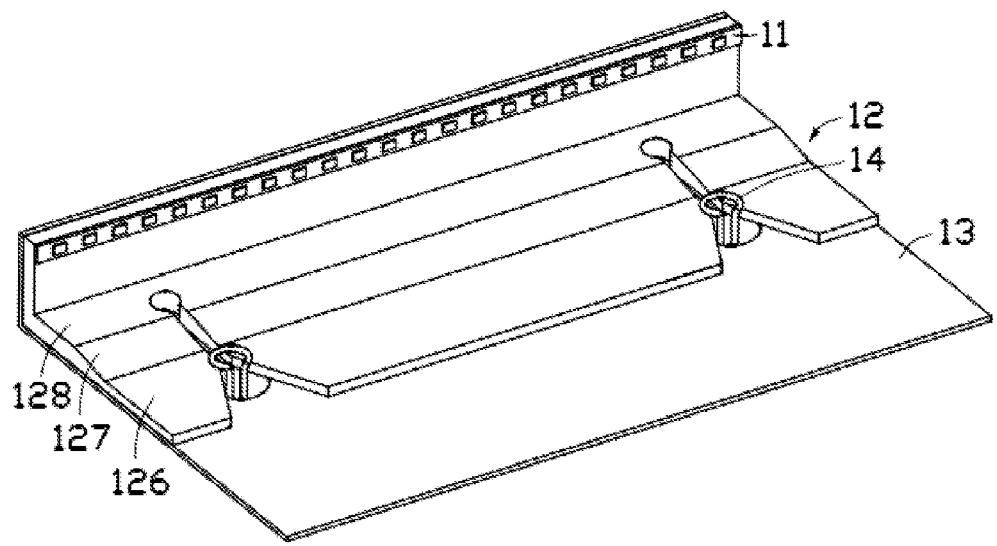
FIG. 3 is an isometric view showing an assembling state of the backlight module according to the first embodiment of the present disclosure.
Figure 4:
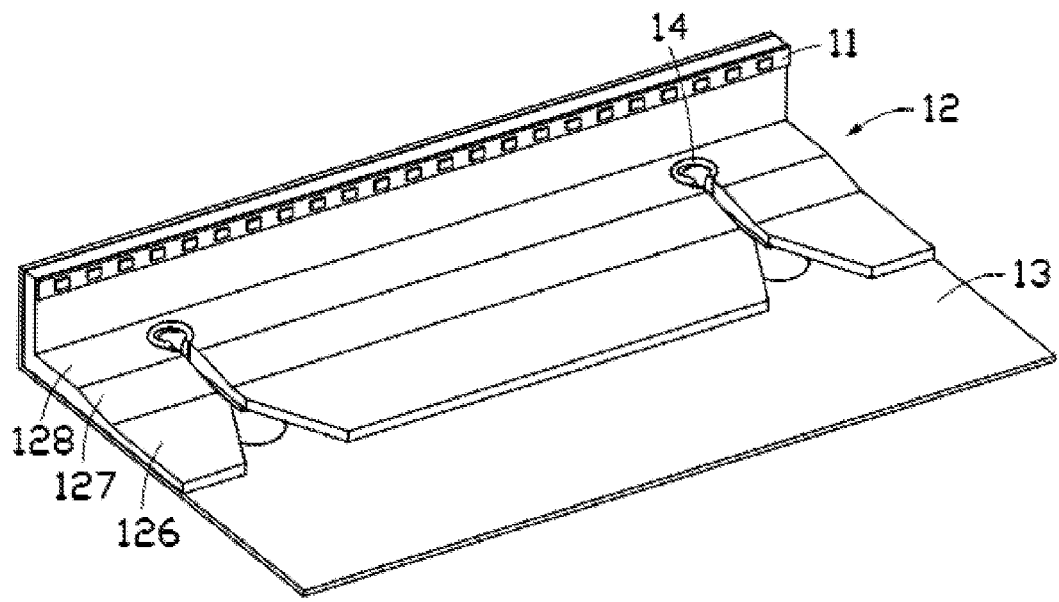
FIG. 4 is an isometric view showing another assembling state of the backlight module according to the first embodiment of the present disclosure.

Referring to FIG. 3 and FIG. 4, FIG. 3 is an isometric view showing an assembling state of the backlight module according to the first embodiment of the present disclosure, and FIG. 4 is an isometric view showing another assembling state of the backlight module according to the first embodiment of the present disclosure.

As shown in FIG. 3, in assembling the backlight module, the thermal plate 12 is firstly arranged on the back cover 13 to make the first hole 121 overlap with the second hole 131, the first sliding slot 124 overlap with the second sliding slot 133, and the inverted V-shaped opening 125 overlap with a connection portion where the third hole 132 and the second sliding slot 133 connect. The first holding apparatus 141 of the elastic holder 14 is arranged to pass through the third hole 132 and the inverted V-shaped opening 125 from the lower side surface of the back cover 13 to make the two first connection apparatuses 143 penetrate through the third hole 132. The elastic holder 14 is pushed to make the inverted V-shaped opening 125 abut the two first connection apparatuses 143, thereby the two first connection apparatuses 143 approach to each other with the guidance of the inverted V-shaped opening 125 and slide into the first sliding slot 124 and the second sliding slot 133. The elastic holder 14 is further pushed to make the two first connection apparatus 143 move along the overlapped first sliding slot 124 and the second sliding slot 133 and finally slide into the first hole 121 and the second hole 131. Thus, the thermal plate 12, the back cover 13 and the elastic holder 14 is assembled as shown in FIG. 4.

In the illustrated embodiment, the upper side surface of the first piece 122 of the thermal plate 12 has a stepped structure, and includes a first upper side surface 126, a second upper side surface 128 protruding from the first upper side surface 126 and a connection surface 127 connecting the first upper side surface 126 and the second upper side surface 128. The first holding apparatus 141 is finally supported on the second upper side surface 128. The connection surface 127 is preferably an inclined surface, which may provide guidance for the first holding apparatus 141 when the elastic holder 14 moves. The second upper side surface 128 of the thermal plate 12 and the lower side surface 134 of the back cover 13 are apart from each other, and the elastic holder 14 penetrates through the first hole 121 and the second hole 131, and holds the second upper side surface 128 of the thermal plate 12 and the lower side surface 132 of the back cover 13, for fixing the thermal plate 12 on the back cover 13.

In the backlight module of the present disclosure, the elastic holder 14 penetrating through the first hole 121 of the thermal plate 12 and the second hole 131 of the back cover 13 is used to hold the two side surfaces of the thermal plate 12 and the back cover 13 apart from each other. Thus, the thermal plate 12 may be fixed on a desired position of the back cover 13 with relatively short assembly time. Moreover, the pressure area of the elastic holder 14 of the present disclosure is relatively large, and pressure uniformity of the thermal plate 12 may be improved and a temperature uniformity of the backlight module is correspondingly improved.

Figure 5:
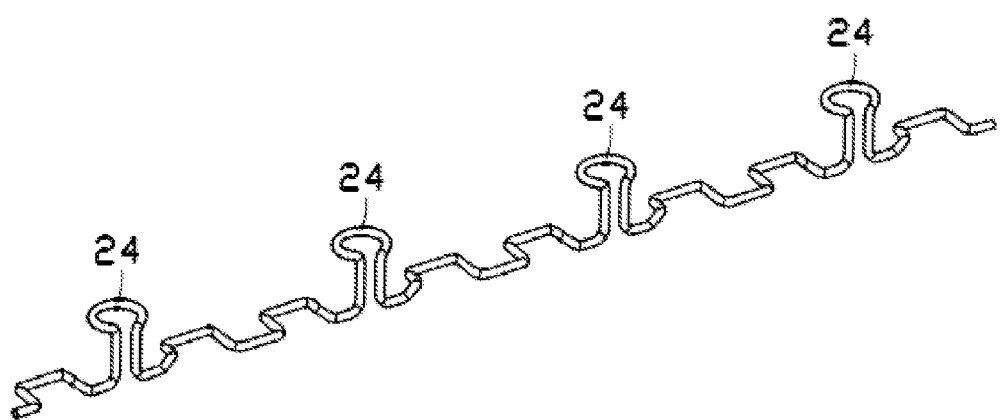
FIG. 5 is an isometric view of an elastic holder of a backlight module according to a second embodiment of the present disclosure.
Figure 6:
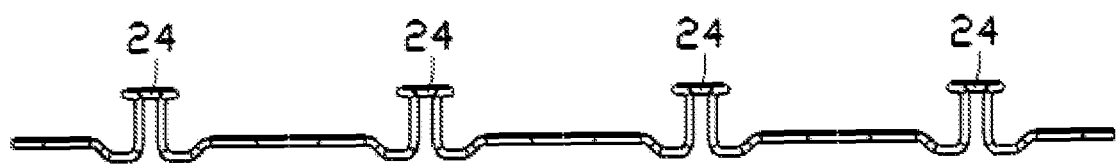
FIG. 6 is a front view of the elastic holder of FIG. 5.

Referring to FIG. 5 and FIG. 6, FIG. 5 is an isometric view of an elastic holder of a backlight module according to a second embodiment of the present disclosure, and FIG. 6 is a front view of the elastic holder of FIG. 5. The backlight module of the second embodiment includes a plurality of elastic holders 24 connected in series. The plurality of elastic holders 24 may be integrally made by a bended wire. In the illustrated embodiment, the elastic holders 24 connected in series are more convenient for assembly, with further improved pressure area and improved pressure uniformity and holding effects between a back cover and a thermal plate.

A liquid crystal display is further provided in the present disclosure. The liquid crystal display may employ the backlight modules of the first and second embodiments.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A backlight module comprising:
a light source;
a thermal plate comprising a first piece and a second piece perpendicular to the first piece, the first piece comprising a first hole defined therein, the light source being arranged on the second piece;
a back cover comprising a second hole defined therein, the first piece being arranged on the back cover, and the second hole being arranged to overlap with the first hole; and
an elastic holder being made by a bended wire and comprising:
a first holding apparatus supported on an upper side surface of the first piece;
two first connection apparatuses connected to an end portion of the first holding apparatus, respectively, the two first connection apparatuses extending in a direction perpendicular to the upper side surface of the first piece and penetrating through the first hole and the second hole;
two second holding apparatuses arranged on two sides of the two first connection apparatuses, the two second holding apparatuses abutting a lower side surface of the back cover;
two second connection apparatuses connected to one of the first connection apparatuses and one of the second holding apparatuses, respectively, the second connection apparatuses bending toward the first holding apparatus in order that a distance between the first holding apparatus and the second holding apparatuses measured in the direction perpendicular to the upper side surface of the first piece being less than an extending distance of the two first connection apparatuses for fixing the thermal plate on the back cover.

2. A backlight module comprising:
a light source;
a thermal plate comprising a first hole defined therein, the light source being arranged on the thermal plate;
a back cover comprising a second hole defined therein, the thermal plate being arranged on the back cover, and the second hole being arranged to overlap with the first hole;
an elastic holder penetrating through the first hole and the second hole, the elastic holder holding a second upper side surface of the thermal plate and a lower side surface of the back cover for fixing the thermal plate on the back cover, wherein the second upper side surface of the thermal plate and the lower side surface of the back cover are apart from each other;
wherein the elastic holder is made by a bended wire and comprises:
a first holding apparatus supported on an upper side surface of the thermal plate;
two first connection apparatuses connected to an end portion of the first holding apparatus, respectively, the two first connection apparatuses extending in a direction perpendicular to the upper side surface of the thermal plate and penetrating through the first hole and the second hole;
two second holding apparatuses arranged on two sides of the two first connection apparatuses, the two second holding apparatuses abutting the lower side surface of the back cover;
two second connection apparatuses connected to one of the first connection apparatuses and one of the second holding apparatuses, respectively, the second connection apparatuses bending toward the first holding apparatus in order that a distance between the first holding apparatus and the second holding apparatuses measured in the direction perpendicular to the upper side surface of the thermal plate being less than an extending distance of the two first connection apparatuses.

3. The backlight module of claim 2, wherein the first holding apparatus has an arced structure, and the second holding apparatuses have a ⊓-shaped structure, respectively.

4. The backlight module of claim 3, wherein the first holding apparatus and the second holding apparatuses are arranged on a same side of a surface defined by the two first connection apparatuses.

5. The backlight module of claim 2, wherein the thermal plate further comprises a first sliding slot connecting the first hole and an edge of the thermal plate, the back cover comprising a third hole and a second sliding slot connecting the second hole and the third hole, the third hole being capable of allowing the first holding apparatus to pass therethrough, the first sliding slot overlapping with the second sliding slot for allowing the first connection apparatuses to slide into the first hole and the second hole via the first sliding slot and the second sliding slot after the first holding apparatus passing through the third hole.

6. The backlight module of claim 5, wherein a distance between outer side edges of the two first connection apparatuses is greater than widths of the first sliding slot and the second sliding slot, the thermal plate comprising an inverted V-shaped opening defined at the edge thereof, the first sliding slot interconnecting the first hole and the inverted V-shaped opening, the inverted V-shaped opening being capable of guiding the first connection apparatuses into the first sliding slot and the second sliding slot.

7. The backlight module of claim 5, wherein the upper side surface of the thermal plate comprises a first upper side surface, the second upper side surface protruding from the first upper side surface, and a connection surface connecting the first upper side surface and the second upper side surface, the first holding apparatus being supported on the second upper side surface.

8. The backlight module of claim 7, wherein the connection surface is an inclined surface.

9. The backlight module of claim 2, wherein the backlight module further comprises a plurality of other elastic holders same with the elastic holder, and integrally made by the bended wire.

10. The backlight module of claim 2, wherein the thermal plate comprises a first piece and a second piece perpendicular to the first piece, the first piece being arranged on the back cover, the first hole being defined in the first piece, the light source being arranged on the second piece.

11. A liquid crystal display comprising a backlight module, the backlight module comprising:
a light source;
a thermal plate comprising a first hole defined therein, the light source being arranged on the thermal plate;
a back cover comprising a second hole defined therein, the thermal plate being arranged on the back cover, and the second hole being arranged to overlap with the first hole;
an elastic holder penetrating through the first hole and the second hole, the elastic holder holding a second upper side surface of the thermal plate and a lower side surface of the back cover for fixing the thermal plate on the back cover, wherein the second upper side surface of the thermal plate and the lower side surface of the back cover are apart from each other;
wherein the elastic holder is made by a bended wire and comprises:
a first holding apparatus supported on an upper side surface of the thermal plate;
two first connection apparatuses connected to an end portion of the first holding apparatus, respectively, the two first connection apparatuses extending in a direction perpendicular to the upper side surface of the thermal plate and penetrating through the first hole and the second hole;
two second holding apparatuses arranged on two sides of the two first connection apparatuses, the two second holding apparatuses abutting the lower side surface of the back cover;
two second connection apparatuses connected to one of the first connection apparatuses and one of the second holding apparatuses, respectively, the second connection apparatuses bending toward the first holding apparatus in order that a distance between the first holding apparatus and the second holding apparatuses measured in the direction perpendicular to the upper side surface of the thermal plate being less than an extending distance of the two first connection apparatuses.

12. The liquid crystal display of claim 11, wherein the first holding apparatus has an arced structure, and the second holding apparatuses have a ⊓-shaped structure, respectively.

13. The liquid crystal display of claim 12, wherein the first holding apparatus and the second holding apparatuses are arranged on a same side of a surface defined by the two first connection apparatuses.

14. The liquid crystal display of claim 11, wherein the thermal plate further comprises a first sliding slot connecting the first hole and an edge of the thermal plate, the back cover comprising a third hole and a second sliding slot connecting to the second hole and the third hole, the third hole being capable of allowing the first holding apparatus to pass therethrough, the first sliding slot overlapping with the second sliding slot for allowing the first connection apparatuses to slide into the first hole and the second hole via the first sliding slot and the second sliding slot after the first holding apparatus passing through the third hole.

15. The liquid crystal display of claim 14, wherein a distance between outer side edges of the two first connection apparatuses is greater than widths of the first sliding slot and the second sliding slot, the thermal plate comprising an inverted V-shaped opening defined at the edge thereof, the first sliding slot interconnecting the first hole and the inverted V-shaped opening, the inverted V-shaped opening being capable of guiding the first connection apparatuses into the first sliding slot and the second sliding slot.

16. The liquid crystal display of claim 14, wherein the upper side surface of the thermal plate comprises a first upper side surface, the second upper side surface protruding from the first upper side surface, and a connection surface connecting the first upper side surface and the second upper side surface, the first holding apparatus being supported on the second upper side surface.

17. The liquid crystal display of claim 16, wherein the connection surface is an inclined surface.

18. The liquid crystal display of claim 11, wherein the backlight module further comprises a plurality of other elastic holders same with the elastic holder, and integrally made by the bended wire.

\* \* \* \* \*